(12) United States Patent  
Mesfin et al.

(10) Patent No.: US 7,883,063 B2
(45) Date of Patent: Feb. 8, 2011

(54) FLAT PANEL MONITOR ASSEMBLY WITH WEIGHT ADJUST MECHANISM

(75) Inventors: Teodros Mesfin, Houston, TX (US); Ernesto Ramirez, Austin, TX (US); Kurt Heggland, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 400 days.

(21) Appl. No.: 12/165,714

(22) Filed: Jul. 1, 2008

(65) Prior Publication Data

US 2010/0001148 A1    Jan. 7, 2010

(51) Int. Cl.
*F16M 11/00* (2006.01)

(52) U.S. Cl. .............................. 248/162.1; 248/123.11; 248/123.2; 248/292.11; 361/679.41

(58) Field of Classification Search .............. 248/162.1, 248/127, 128, 132, 133, 161, 158, 160, 123.11, 248/123.2, 292.11, 292.13, 292.12, 676, 248/917–923; 361/679.01, 679.02, 379.21, 361/679.41, 681
See application file for complete search history.

(56) References Cited

U.S. PATENT DOCUMENTS

| 5,396,400 A | 3/1995 | Register et al. |
| 5,568,359 A | 10/1996 | Cavello et al. |
| 6,049,454 A | 4/2000 | Howell et al. |
| 6,220,558 B1 | 4/2001 | Broder et al. |
| 6,833,988 B2 | 12/2004 | Kamphuis et al. |
| 6,987,666 B2 | 1/2006 | Medica et al. |
| 6,997,422 B2 * | 2/2006 | Sweere et al. .......... 248/123.11 |
| 7,036,787 B1 * | 5/2006 | Lin ............................. 248/676 |
| 7,088,577 B2 | 8/2006 | Lauffer et al. |
| 7,198,237 B2 * | 4/2007 | Cho et al. .................... 248/133 |
| 7,258,311 B2 * | 8/2007 | Yen et al. ..................... 248/133 |
| 7,413,150 B1 * | 8/2008 | Hsu ...................... 248/123.11 |
| 7,424,991 B2 * | 9/2008 | Kim et al. ................ 248/125.9 |
| 7,584,933 B2 * | 9/2009 | Chih ....................... 248/372.1 |
| 2005/0236533 A1 | 10/2005 | McRight et al. |

* cited by examiner

*Primary Examiner*—Terrell Mckinnon
*Assistant Examiner*—Todd M. Epps
(74) *Attorney, Agent, or Firm*—Larson Newman & Abel, LLP

(57) ABSTRACT

A device comprising a monitor and a monitor support stand. The monitor support is configured to hold the monitor in a plurality of fixed locations. The monitor support includes a spring, a spring counterweight balance, and a cam. The spring is configured to support a weight of the monitor. The spring counterweight balance is coupled to the spring, and is configured reduce a force required to adjust a tension of the spring. The cam is coupled to the spring counterweight balance, and has a plurality of positions, wherein each of the plurality of positions is configured to adjust a weight range of the monitor that the spring can support.

20 Claims, 6 Drawing Sheets

FLAT PANEL MONITOR ASSEMBLY WITH WEIGHT ADJUST MECHANISM

FIELD OF THE DISCLOSURE

This disclosure generally relates to information handling systems, and more particularly relates to a flat panel monitor stand for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, many information handling systems have stands to support a flat panel monitor. Some monitor stands have counterweight balances that are tuned to accommodate a very narrow variation of monitor panel sizes. The counterweight balances allow a user to slide the monitor up and down on its stand to customize the viewing height. The counterweight balances then hold the monitor in the fixed location chosen by the user.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
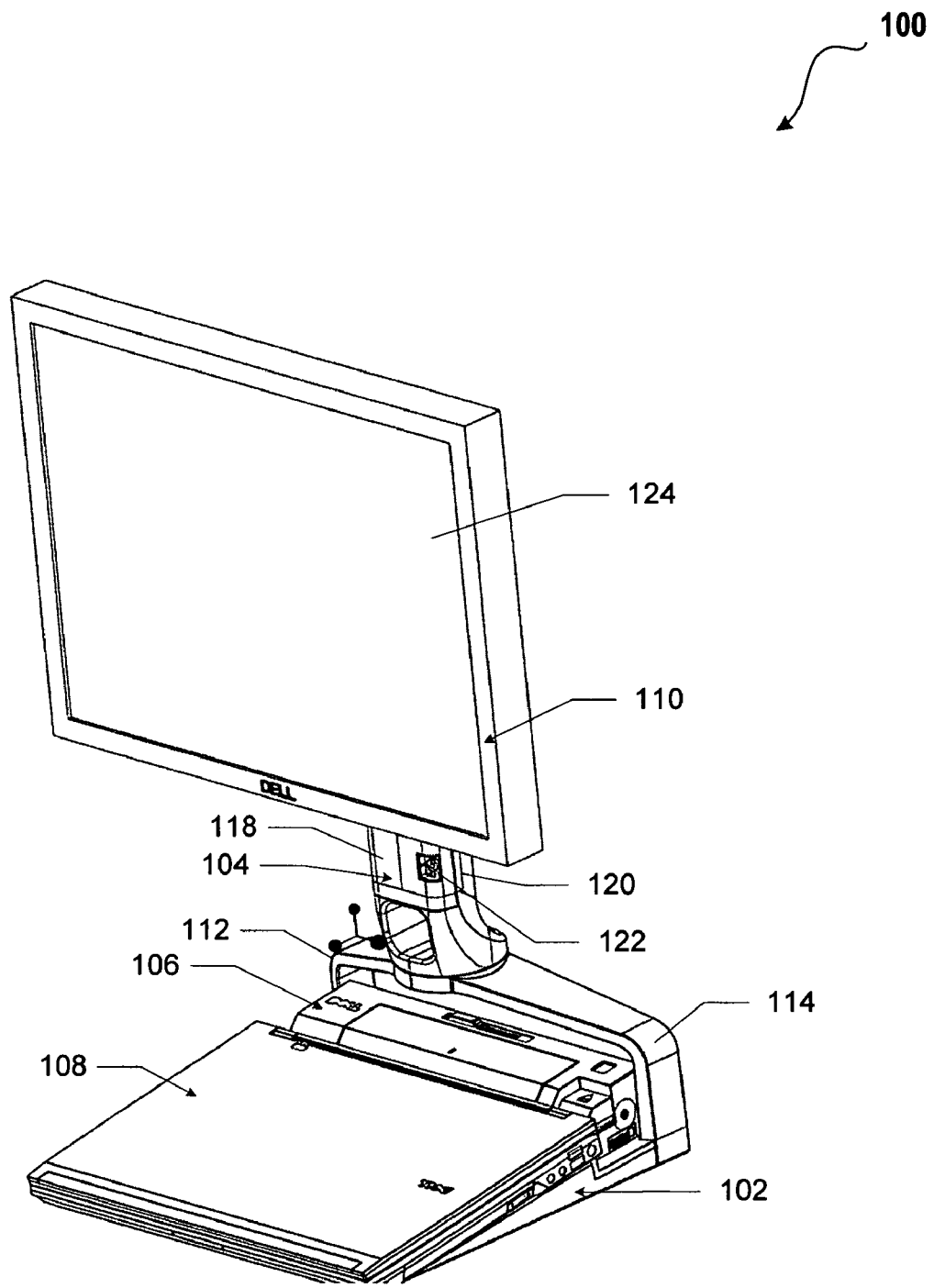
FIG. 1 is a perspective view of a monitor assembly.

FIG. 1 shows a perspective view of a monitor assembly 100 for an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The monitor assembly 100 includes a base 102, a monitor support 104, a docking station 106, a computer 108, and a monitor 110. The base 102 has support members 112 and 114. The monitor support 104 has panels 118 and 120, an adjustment 122, and channels (not shown). The monitor 110 has a display screen 124. The monitor support 104 is connected to the support members 112 and 114 of the base 102. The docking station 106 is snap fitted onto the base 102. The monitor 110 is connected to the monitor support 104 through a monitor attachment plate (not shown). The monitor attachment plate is connected to the first panel 118 of the monitor support 104. The computer 108 is connected to the docking station 106, and is in communication with the monitor 110 through the docking station. The monitor support 104 can swivel on top of the support members 112 and 114 to provide a user of the monitor assembly 100 with different angles at which to view the display screen 124 of the monitor 110. The docking station 106 can provide a connection between the computer 108 and the monitor 110. The attachment plate can slide up and down in the channels to allow the monitor 110 to be adjusted to a specific height for the user. The user of the monitor stand 100 can access the adjustment 122 through the panel 118.

The monitor support 104 includes a spring and counterweight balances (not shown) within the first and second panels 118 and 120 that can be calibrated to support the weight of the monitor 110. The spring and the counterweight balances can allow the monitor 110 to slide along the channels, and to be held in a fixed location along the channels. The adjustment 122 can be rotated between multiple positions to change an amount of weight associated with the monitor 110 that the spring and the counterweight balances of the monitor support 104 can hold in a fixed position. Thus, the spring and counterweight balances can prevent the monitor 110 from either falling to the bottom of the channels or rising to the top of the channels. If the position of the adjustment 122 sets the spring and the counterweight balances for a monitor weight range that is more than the weight of the monitor 110, then the monitor will tend toward the top of the channels and not stay at a location set by the user. However, if the position of the adjustment 122 sets the spring and the counterweight balances for a weight range that is less than the weight of the monitor 110, then the monitor will tend toward the bottom of the channels and not stay at the location set by the user.

The adjustment 122 initially may be set to a specific position to set the spring and the counterweight balances to the weight range associated with the monitor 110. However, if the user substitutes a new monitor that is not within the weight range that the spring and the counterweight balances are set for, the adjustment 122 may be rotated to a new position to recalibrate the spring and the counterweight balances to a new weight range associated with the weight of the new monitor.

For example, the spring and counterweight balances of the monitor assembly 100 can be set for two different monitor weight ranges. In this example, the adjustment 122 can rotate between an up position, for lower weight monitors, and a down position, for higher weight monitors. The monitor assembly 100 may initially be equipped with the monitor 110 that has a weight within the lower weight range, such that the adjustment 122 is set in the up position. This position of the adjustment 122 can set the spring and the counterweight balances to hold the lower weight monitors at any fixed location along the channels. However, the user may substitute a new monitor that has a weight within the higher weight range. If the new monitor is attached to the monitor support 100 with the spring and the counterweight balances set for the lower weight range, the new monitor will not stay at a fixed location along the channels but will fall to the bottom of the channels. Thus, the user may use a tool provided with the monitor assembly 100 to rotate the adjustment 122 to the down position so that the spring and the counterweight balances are set to hold the new monitor in a fixed location without the monitor falling to the bottom of the channels. In this example only two positions of the adjustment 122, the spring, and the counterweight balances were described. However, it should be understood that the adjustment could have multiple positions to support multiple different ranges of monitor weights.

Figure 2:
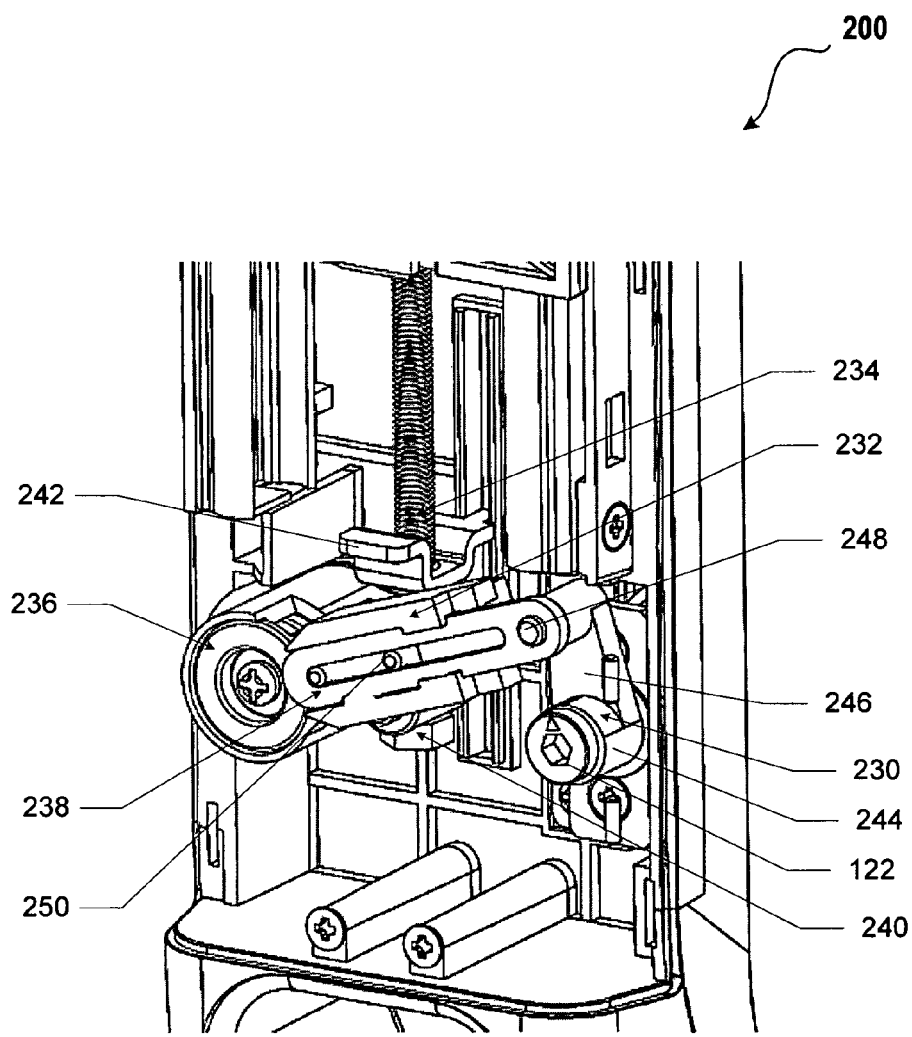
FIG. 2 is a perspective view of an inside of the monitor assembly with an embodiment of an adjustment mechanism in a first position.
Figure 3:
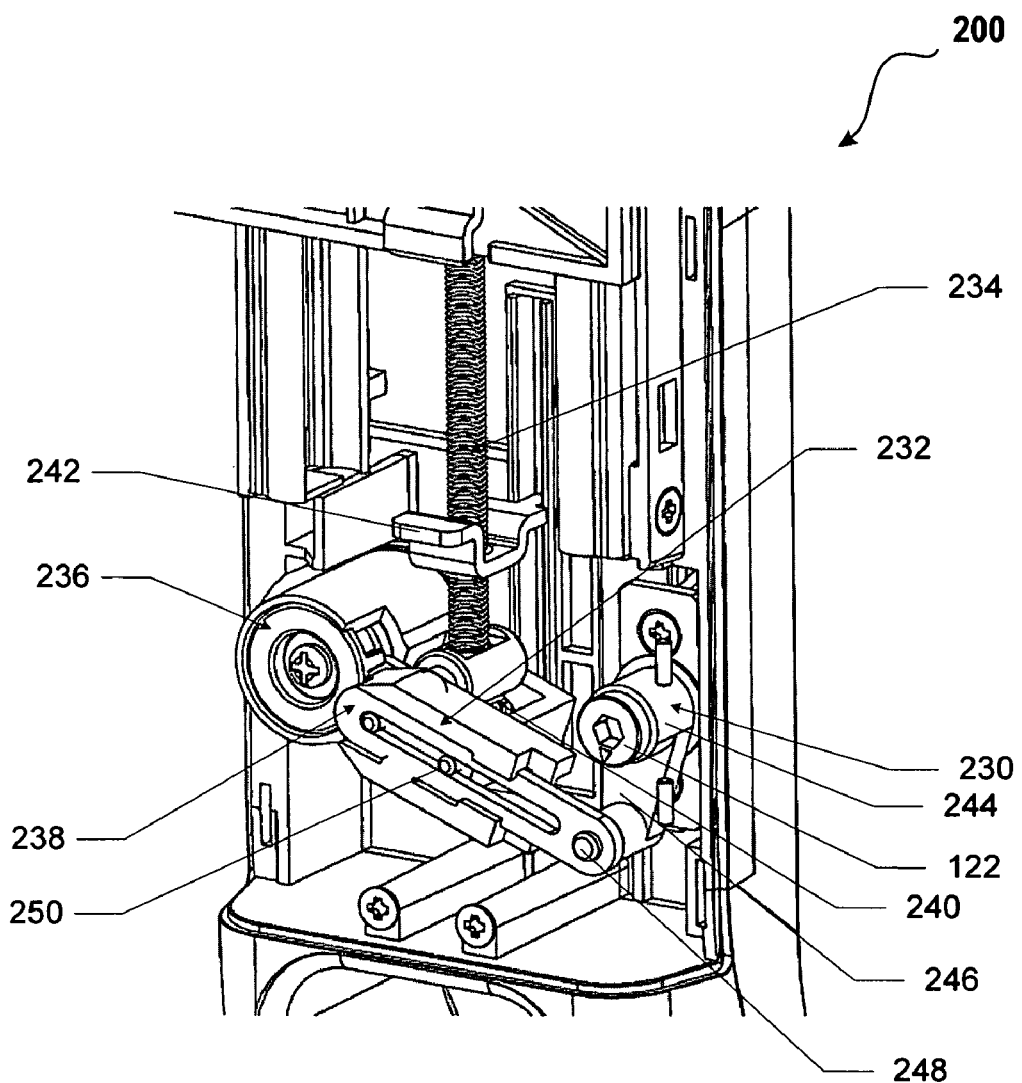
FIG. 3 is a perspective view of the inside of the monitor assembly with the adjustment mechanism in a second position.

FIGS. 2 and 3 show an internal view of the monitor assembly 100 including an adjustment portion 200 having an adjustment 122, a cam 230, an arm 232, a spring 234, a spring counterweight balance 236, a sleeve 238, and a rod 240. The cam 230 includes a cylindrical portion 244 connected to the adjustment 122, and an arm portion 246. The arm 232 is connected to the spring counterweight balance 236, and the arm is also in physical communication with the sleeve 238. The sleeve 238 is connected to the arm portion 246 of the cam 230 by a pin 248. The spring 234 is attached to the rod 240 by a connector 242. The arm 232 is also connected to the rod 240 by a pin 250.

The adjustment 122 can rotated between a number of positions in response to a torque being applied to the adjustment from a tool, such as a hex key, a screw driver, and the like. As the tool rotates the adjustment 122, the cam 230 is similarly rotated. Thus, if the adjustment 122 is rotated in a clockwise direction, then the cam 230 is also rotated in a clockwise direction. The cylindrical portion 244 is connected to the adjustment 122 to receive the rotational force from the adjustment and rotate the arm portion 246 of the cam 230. The arm portion 246 of the cam 230 can be rotated between an up position and a down position.

As the arm portion 246 of the cam 230 is rotated between the up and down positions, the pin 248 slides the sleeve 238 within the arm 232. The sliding of the sleeve 238 allows the arm 246 of the cam 230 and the arm 232 to rotate together without binding with each other. For the first half of the rotation of the cam 230, the pin 248 slides the sleeve 238 toward the spring counterweight balance 236, and during the second half of the rotation of the cam 230 the pin 248 slides the sleeve away from the spring counterweight balance 236. The sleeve 238 is continuously in physical communication with the arm 232, and thus the force from the arm portion 246 of the cam 230 can be transferred through the sleeve to the arm 232. The arm 232 can rotate between an up position and a down position. The connector 242 holds the spring 234 in a fixed position along the rod 240. The rod 240 can be threaded such that the location of the connector 242 on the rod can be adjusted.

When cam 230 and the arm 232 are in the up position, as shown in FIG. 2, the rod 240 is pushed up by the arm and the spring 234 is held in a more compressed position. In this position the monitor assembly 100 is set to support and hold smaller sized monitors in fixed positions. However, when the cam 230 and the arm 232 are in the down position, as shown in FIG. 3, the rod 240 is pulled down by the arm and the spring 234 is held in an extended position so that a larger monitor can be supported by the spring and the counterweight balances (not shown) of the monitor assembly 100. The spring counterweight balance 236 can be a tension spring, such that the force required to adjust the spring 234 can be greatly reduced. Thus, as a user turns the adjustment 122 the force needed to either compress or extend the spring 234 is much less than without the spring counterweight balance 236.

Figure 4:
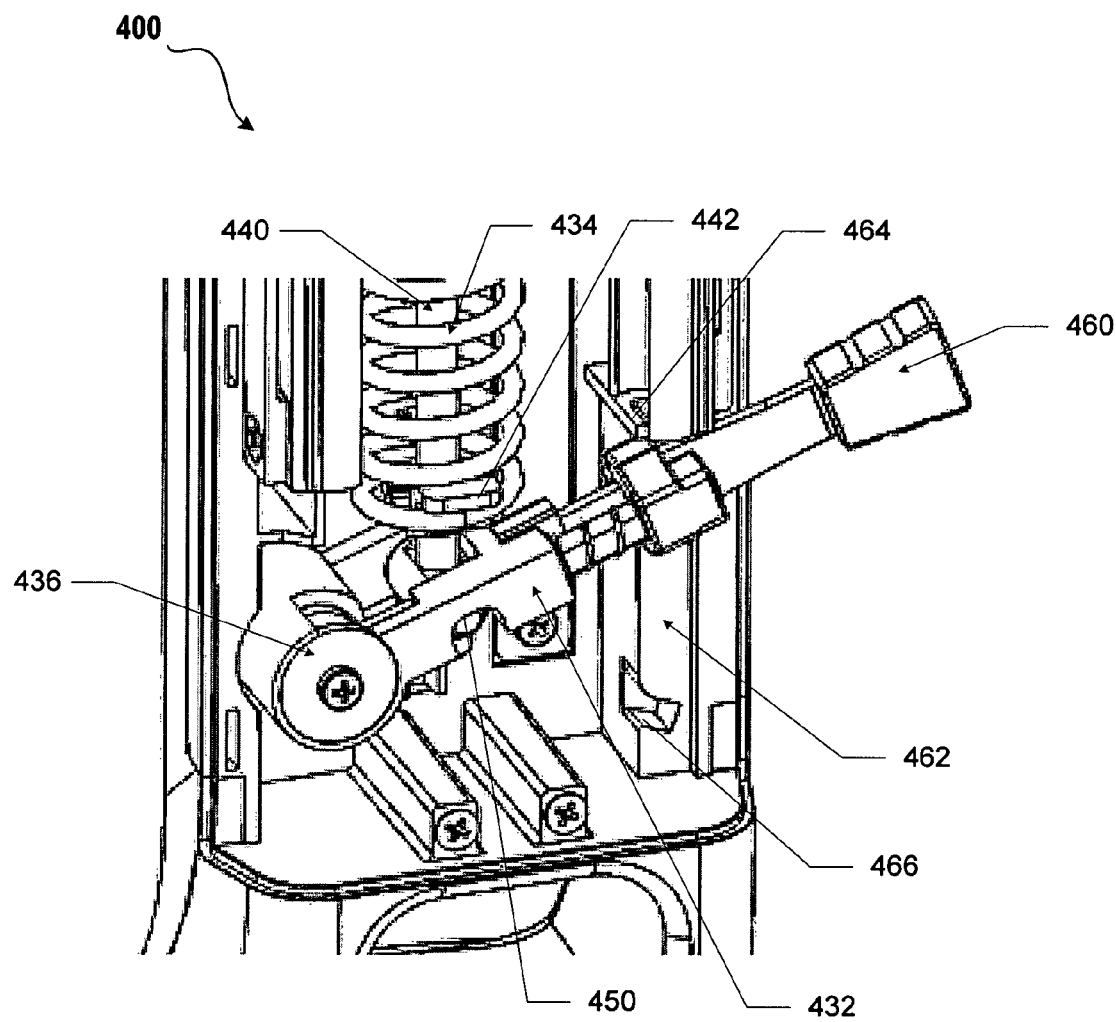
FIG. 4 is a perspective view of the inside of the monitor assembly with an alternative embodiment of the adjustment mechanism in a first position.
Figure 5:
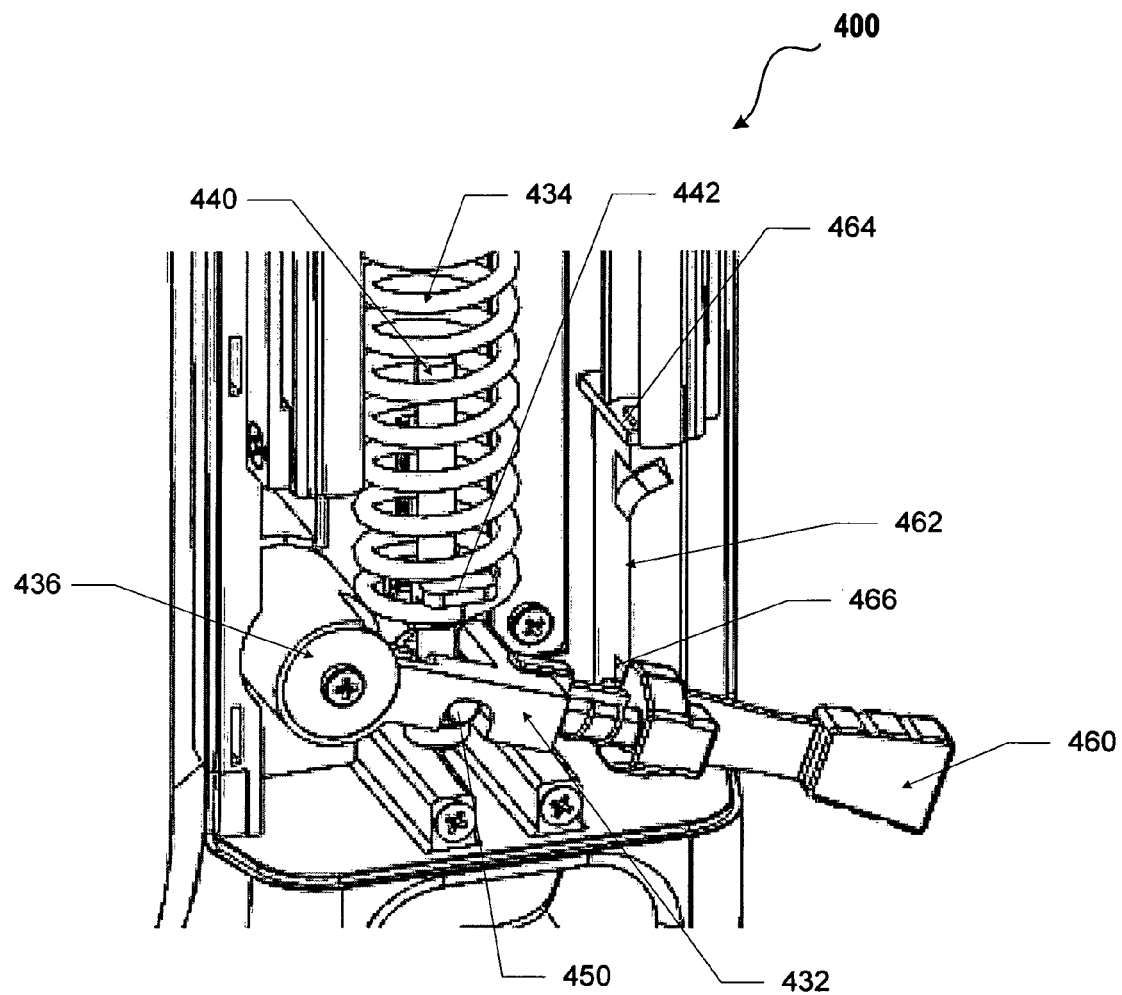
FIG. 5 is a perspective view of the inside of the monitor assembly with the alternative embodiment of the adjustment mechanism in a second position.

FIGS. 4 and 5 show an internal view of the monitor assembly 100 including an alternative adjustment portion 400 having an arm 432, a spring 434, a spring counterweight balance 436, a rod 440, and a setting control 462. The arm 432 is connected to the spring counterweight balance 436 and to a handle 460. Additionally, the spring 434 is attached to the rod 440 by a connector 442. The arm 432 is connected to the rod 440 by a pin 450, and the arm is in physical communication with the setting control 462. The setting control 462 has an up position 464 and a down position 466.

The arm 432 can move the location of the rod 440 and thus change the compression of the spring 434. When the arm 432 is in the up position 464, as shown in FIG. 4, the rod 440 is pushed up by the arm and as a result the spring 434 is compressed. While the spring 434 is compressed, the size of monitor that can be held in a fixed position by the spring and the counterweight balances (not shown) is reduced. When the arm 432 is in the down position 466, as shown in FIG. 5, the rod 440 is pulled down by the arm and as a result the spring 434 is extended. The extension of the spring 434 allows a larger monitor to be held in a fixed position by the spring and the counterweight balances. The spring counterweight balance 436 allows a user to move the handle 460 and the arm 432 to extend or compress the spring 434 with a much lower force than without the spring counterweight balance.

Figure 6:
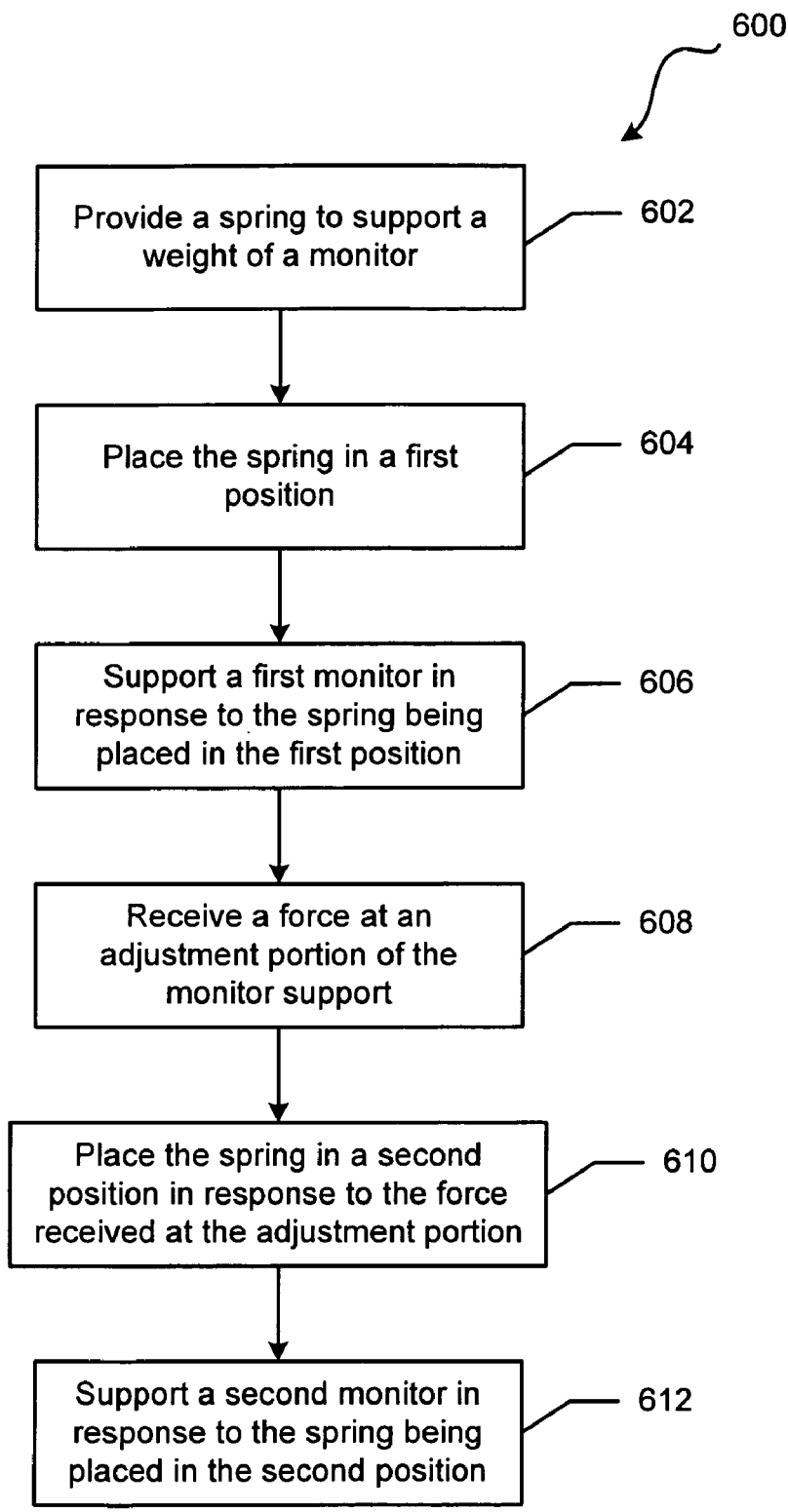
FIG. 6 is a flow diagram of a method for adjusting a monitor support mechanism.

FIG. 6 shows a flow diagram of a method 600 for adjusting a monitor support. At block 602, a spring is provided to support the weight of a monitor. The spring is placed in a first position at block 604. At block 606, a first monitor is supported in response to the spring being placed in the first position. The first monitor is within a first weight range. The first monitor can also be held at fixed locations along the monitor assembly. A force is received at an adjustment portion of the monitor support at block 608. At block 610, the spring is placed in a second position in response to the force received at the adjustment portion of the monitor support. A second monitor is supported in response to the spring being placed in the second position at block 612. The second monitor can also be held at fixed locations along the monitor assembly. The second monitor is within a second weight range that is different than the first weight range.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A device comprising:
   a monitor; and
   a monitor support configured to hold the monitor in a plurality of fixed locations, the monitor support including:
      a spring configured to support a weight of the monitor;
      a spring counterweight balance coupled to the spring, the spring counterweight balance configured reduce a force required to adjust a tension of the spring; and
      a cam coupled to the spring counterweight balance, the cam having a plurality of positions, wherein each of the plurality of positions is configured to adjust a weight range of the monitor that the spring can support.

2. The device of claim 1 wherein the monitor support further comprises:
   a rod connected to the spring, the rod configured to pull and push an end of the spring to adjust the tension of the spring.

3. The device of claim 2 further comprising:
   an arm connected between the cam and the rod, the arm configured to move the rod up and down in response to the force received from the cam.

4. The device of claim 1 further comprising:
   an adjustment connected to the cam, the adjustment configured to transfer the force received from a user to the cam.

5. The device of claim 4 wherein the adjustment is a lever extending beyond the monitor support.

6. The device of claim 4 wherein the adjustment is a knob within the monitor support.

7. The device of claim 1 wherein the cam is adapted to be placed in a first position if the weight of the monitor is above a specified weight.

8. The device of claim 7 wherein the cam is adapted to be placed in a second position if the weight of the monitor is below the specified weight.

9. A device comprising:
   a monitor configured to communicate with a portable computer;
   a docking station in communication with the monitor, the docking station configured to provide communication between the monitor and the portable computer; and
   a monitor support configured to hold the monitor in a plurality of fixed locations, the monitor support including:
      a spring configured to support a weight of the monitor;
      a spring counterweight balance coupled to the spring, the spring counterweight balance configured reduce a force required to adjust a tension of the spring; and
      a cam coupled to the spring counterweight balance, the cam having a plurality of positions, wherein each of the plurality of positions is configured to adjust a weight range of the monitor that the spring can support.

10. The device of claim 9 wherein the monitor support further comprises:
    a rod connected to the spring, the rod configured to pull and push an end of the spring to adjust the tension of the spring.

11. The device of claim 10 further comprising:
    an arm connected between the cam and the rod, the arm configured to move the rod up and down in response to the force received from the cam.

12. The device of claim 9 further comprising:
    an adjustment connected to the cam, the adjustment configured to transfer the force received from a user to the cam.

13. The device of claim 9 wherein the cam is adapted to be placed in a first position if the weight of the monitor is above a specified weight.

14. The device of claim 13 wherein the cam is adapted to be placed in a second position if the weight of the monitor is below the specified weight.

15. A device comprising:
    a monitor; and
    a monitor support configured to hold the monitor in a plurality of fixed locations, the monitor support including:
       a spring configured to support a weight of the monitor;
       a spring counterweight balance coupled to the spring, the spring counterweight balance configured reduce a force required to adjust a tension of the spring;
       a cam coupled to the spring counterweight balance, the cam having a plurality of positions, wherein each of the plurality of positions is configured to adjust a weight range of the monitor that the spring can support;
       a rod connected to the spring, the rod configured to pull and push an end of the spring to adjust the tension of the spring; and
       an adjustment connected to the cam, the adjustment configured to transfer the force received from a user to the cam, the force used to adjust a location of the rod in response to a position the cam.

16. The device of claim 15 further comprising:
    an arm connected between the cam and the rod, the arm configured to move the rod up and down in response to the force received from the cam.

17. The device of claim 15 wherein the adjustment is a lever extending beyond the monitor support.

18. The device of claim 15 wherein the adjustment is a knob within the monitor support.

19. The device of claim 15 wherein the cam is adapted to be placed in a first position if the weight of the monitor is above a specified weight.

20. The device of claim 19 wherein the cam is adapted to be placed in a second position if the weight of the monitor is below the specified weight.

* * * * *